(12) United States Patent
Song

(10) Patent No.: US 10,625,738 B2
(45) Date of Patent: Apr. 21, 2020

(54) APPARATUS AND METHOD FOR ELECTRIC VEHICLE COLLISION AVOIDANCE

(71) Applicant: CAMSYS Corp., Incheon (KR)

(72) Inventor: Min Soo Song, Gyeonggi-do (KR)

(73) Assignee: CAMSYS Corp., Incheon (KR)

( * ) Notice: Subject to any disclaimer, the term of this patent is extended or adjusted under 35 U.S.C. 154(b) by 0 days.

(21) Appl. No.: 16/034,804

(22) Filed: Jul. 13, 2018

(65) Prior Publication Data

US 2019/0039608 A1 Feb. 7, 2019

(30) Foreign Application Priority Data

Aug. 7, 2017 (KR) .......................... 10-2017-0099749

(51) Int. Cl.
| | |
|---|---|
| *B60W 30/09* | (2012.01) |
| *B60W 30/095* | (2012.01) |
| *B60L 3/00* | (2019.01) |
| *B60L 3/04* | (2006.01) |
| *G06K 9/00* | (2006.01) |
| *B60Q 9/00* | (2006.01) |

(52) U.S. Cl.
CPC .......... *B60W 30/09* (2013.01); *B60L 3/0015* (2013.01); *B60L 3/0023* (2013.01); *B60L 3/04* (2013.01); *B60Q 9/008* (2013.01); *B60W 30/0956* (2013.01); *G06K 9/00805* (2013.01); *B60L 2240/12* (2013.01); *B60L 2240/80* (2013.01); *B60L 2250/10* (2013.01); *B60L 2250/16* (2013.01); *B60L 2260/50* (2013.01); *B60W 2420/42* (2013.01)

(58) Field of Classification Search
CPC ............. B60W 30/09; B60W 30/0956; B60W 2420/42; B60W 50/14; B60W 10/26; B60W 10/08; B60W 2710/248; B60W 2710/083; B60W 2050/146; B60L 3/0015; B60L 3/04; B60L 3/0023; B60L 2260/50; B60L 2250/16; B60L 2250/10; B60L 2240/80; B60L 2240/12; B60Q 9/008; G06K 9/00805; B60Y 2200/91
USPC .......................................................... 701/28
See application file for complete search history.

(56) References Cited

FOREIGN PATENT DOCUMENTS

| | | |
|---|---|---|
| JP | 2014-067276 A | 4/2014 |
| KR | 10-2015-0019856 A | 2/2015 |
| KR | 10-2015-0049544 A | 5/2015 |

(Continued)

*Primary Examiner* — Brian P Sweeney
(74) *Attorney, Agent, or Firm* — Nelson Mullins Riley & Scarborough LLP; Kongsik Kim, Esq.

(57) ABSTRACT

Disclosed are an apparatus and a method for electric vehicle collision avoidance. The apparatus for electric vehicle collision avoidance may include: a camera unit configured to acquire an image of the surrounding of an electric vehicle; a monitoring unit configured to control the camera unit such that the image is acquired as a preset number of image frames, monitor changes in consecutive image frames to recognize an object present in the image, estimate a distance between the electric vehicle and the object based on the position of the recognized object in the image, and generate a power cutoff command signal if the estimated distance is smaller than or equal to a preset distance; and a power management unit configured to cut off the power of a battery pack of the electric vehicle in response to the power cutoff command signal.

10 Claims, 4 Drawing Sheets

(56) References Cited

FOREIGN PATENT DOCUMENTS

| KR | 10-2017-0022206 A | | 3/2017 | | |
|---|---|---|---|---|---|
| KR | 2017-0022206 A | * | 3/2017 | ............... | B60Q 1/44 |
| KR | 2018-0106336 A | * | 10/2018 | | |

* cited by examiner

APPARATUS AND METHOD FOR ELECTRIC VEHICLE COLLISION AVOIDANCE

CROSS-REFERENCE TO RELATED APPLICATIONS

This application claims the benefit of Korean Patent Application No. 10-2017-0099749, filed with the Korean Intellectual Property Office on Aug. 7, 2017, the disclosure of which is incorporated herein by reference in its entirety.

BACKGROUND

1. Technical Field

The present invention relates to an apparatus and a method for electric vehicle collision avoidance.

2. Description of the Related Art

In recent times, there are a growing number of vehicles that employ the advanced driver assistance system (ADAS) for a more stable and more comfortable driving experience. The advanced driver assistance system may use various sensors, vision systems, and laser systems to detect risks of accidents while a vehicle is being driven or parked and warn the driver or control the vehicle.

In particular, an advanced driver assistance system may provide a function for preventing collisions by using use a sensor, such as an ultrasonic sensor, to monitor the distance between vehicles and warning the driver if the inter-vehicle distance becomes smaller than a set value.

However, when relying only on sensors to prevent collisions between vehicles, it can be difficult to measure the inter-vehicle distances in various driving environments, and the measured inter-vehicle distances can be inaccurate.

Thus, there is a need for a technology for acquiring information regarding the surrounding circumstances of a driving vehicle using various methods other than by sensors and preventing collisions between vehicles based thereon.

SUMMARY OF THE INVENTION

An aspect of the invention is to provide an apparatus and a method for electric vehicle collision avoidance which enable surveillance of the surroundings of an electric vehicle by using photographed images of the surroundings of the electric vehicle and, after an object is detected as being present around the electric vehicle and approaching, cuts off the power of the electric vehicle if the object enters a region in which the electric vehicle is present.

One aspect of the present invention provides an apparatus for electric vehicle collision avoidance.

An apparatus for electric vehicle collision avoidance according to an embodiment of the invention may include: a camera unit configured to acquire an image of the surrounding of an electric vehicle; a monitoring unit configured to control the camera unit such that the image is acquired as a preset number of image frames, monitor changes in consecutive image frames to recognize an object present in the image, estimate a distance between the electric vehicle and the object based on the position of the recognized object in the image, and generate a power cutoff command signal if the estimated distance is smaller than or equal to a preset distance; and a power management unit configured to cut off the power of a battery pack of the electric vehicle in response to the power cutoff command signal.

The monitoring unit may estimate the distance between the electric vehicle and the object by using a danger region, an alert region, and a surveillance region, which may be set in order of closeness to the electric vehicle according to preset distances from the electric vehicle.

The danger region, the alert region, the surveillance region, and a safety region, which represents the outside of the surveillance region, may be displayed in order on a screen, from a boundary region towards a center region of the screen, according to preset distances.

The monitoring unit may determine that an object has appeared if the object is detected in the surveillance region during a monitoring using image frames acquired in a first number per second, and the monitoring unit may monitor changes in the consecutive image frames by using image frames acquired in a second number per second if the object enters from the surveillance region into the alert region, where the second number may be greater than the first number.

The monitoring unit may determine that the object has appeared in the surveillance region if the object enters from the safety region into the surveillance region on the screen or if the object grows in size while in the safety region to be displayed as encroaching the surveillance region.

The monitoring unit may generate the power cutoff command signal if the object enters from the alert region into the danger region.

The monitoring unit may detect the approaching of an object by estimating the approaching speed of the object from a rate of change of the size of the object in the consecutive image frames.

The monitoring unit may use the approaching speed to estimate a first entry prediction time, which is associated with the time of entry of the object from the surveillance region into the alert region, and a second entry prediction time, which is associated with the time of entry of the object from the alert region into the danger region.

The monitoring unit may generate the power cutoff command signal at a preset time before the second entry prediction time.

The camera unit may include a multiple number of cameras installed respectively on the front, rear, left, and right side of the electric vehicle for acquiring images in four directions with respect to the electric vehicle.

A notification unit may further be included that is configured to auditorily or visually output the monitoring information generated by the monitoring unit.

Another aspect of the present invention provides a method for electric vehicle collision avoidance performed by an apparatus for electric vehicle collision avoidance.

A method for electric vehicle collision avoidance according to an embodiment of the invention may include: acquiring an image of the surrounding of an electric vehicle as a preset number of image frames; recognizing an object present in the image by monitoring changes in consecutive image frames; estimating the distance between the electric vehicle and the object based on the position of the recognized object in the image; and cutting off the power of a battery pack of the electric vehicle if the estimated distance is smaller than or equal to a preset distance.

Estimating the distance between the electric vehicle and the object may entail estimating the distance between the electric vehicle and the object by using a danger region, an alert region, and a surveillance region set in order of closeness to the electric vehicle according to preset distances from the electric vehicle.

The danger region, the alert region, the surveillance region, and a safety region representing the outside of the surveillance region may be displayed in order on a screen, from a boundary region towards a center region of the screen, according to preset distances.

An apparatus and a method for electric vehicle collision avoidance according to an embodiment of the invention can prevent collisions for an electric vehicle by monitoring the surroundings of an electric vehicle using photographed images of the surroundings of the electric vehicle and, when an object is detected as being present around the electric vehicle and approaching, cutting off the power of the electric vehicle if the object enters a region in which the electric vehicle is present.

Also, as the power of the battery pack in the electric vehicle is cut off, passengers and animals within the vehicle can be protected from otherwise being harmed by the electrical energy of the electric vehicle.

Additional aspects and advantages of the present invention will be set forth in part in the description which follows, and in part will be obvious from the description, or may be learned by practice of the invention.

DETAILED DESCRIPTION OF THE INVENTION

In the present specification, an expression used in the singular encompasses the expression of the plural, unless it has a clearly different meaning in the context. In the present specification, terms such as "comprising" or "including," etc., should not be interpreted as meaning that all of the components or steps are necessarily included. That is, some of the components or steps may not be included, while other additional components or steps may be further included. Also, terms such as "part", "module", etc., used in the present specification refer to a unit that processes at least one function or operation, where such a unit can be implemented as hardware or software or as a combination of hardware and software.

Various embodiments of the invention will be described below in more detail with reference to the accompanying drawings.

Figure 1:
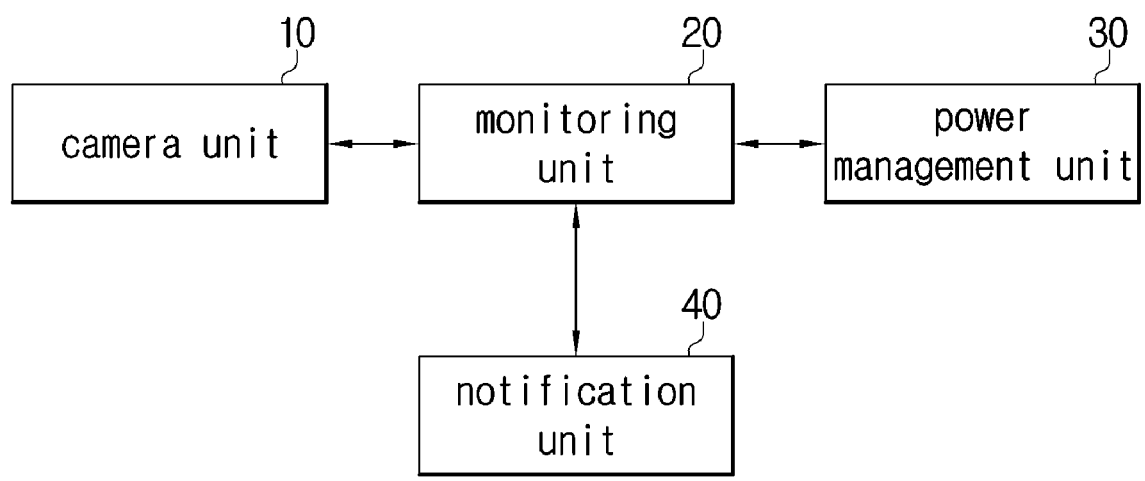
FIG. 1 schematically illustrates the composition of an apparatus for electric vehicle collision avoidance according to an embodiment of the invention.
Figure 2:
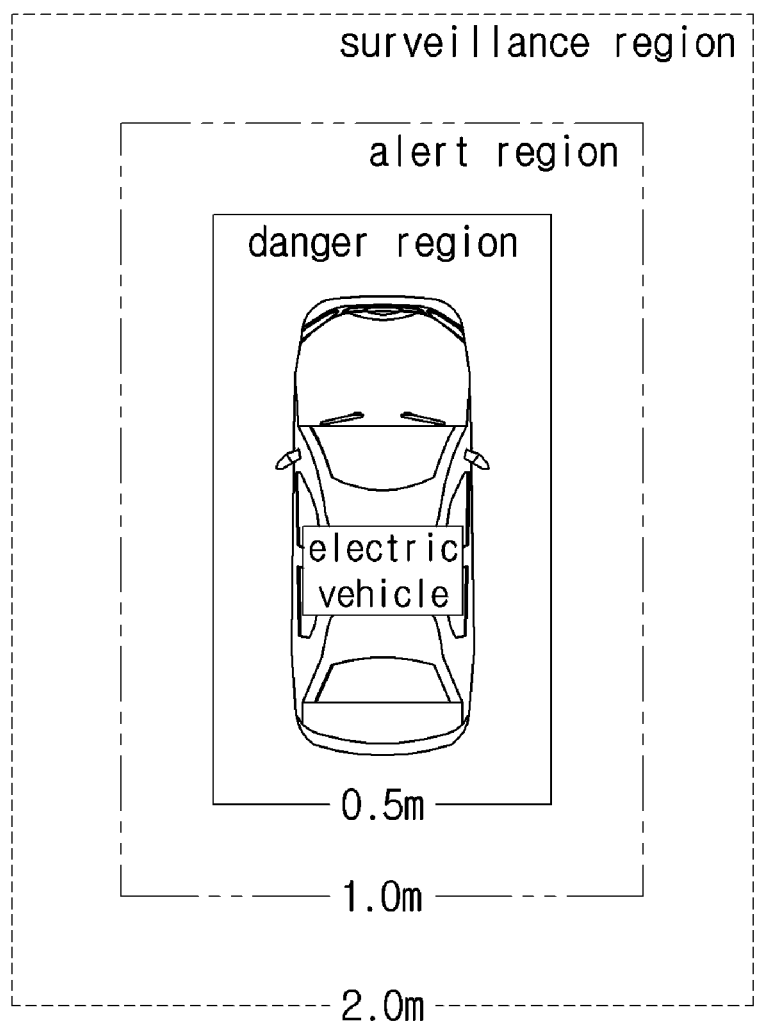
FIG. 2 illustrates an example of regions configured according to distance from the electric vehicle.
Figure 3:
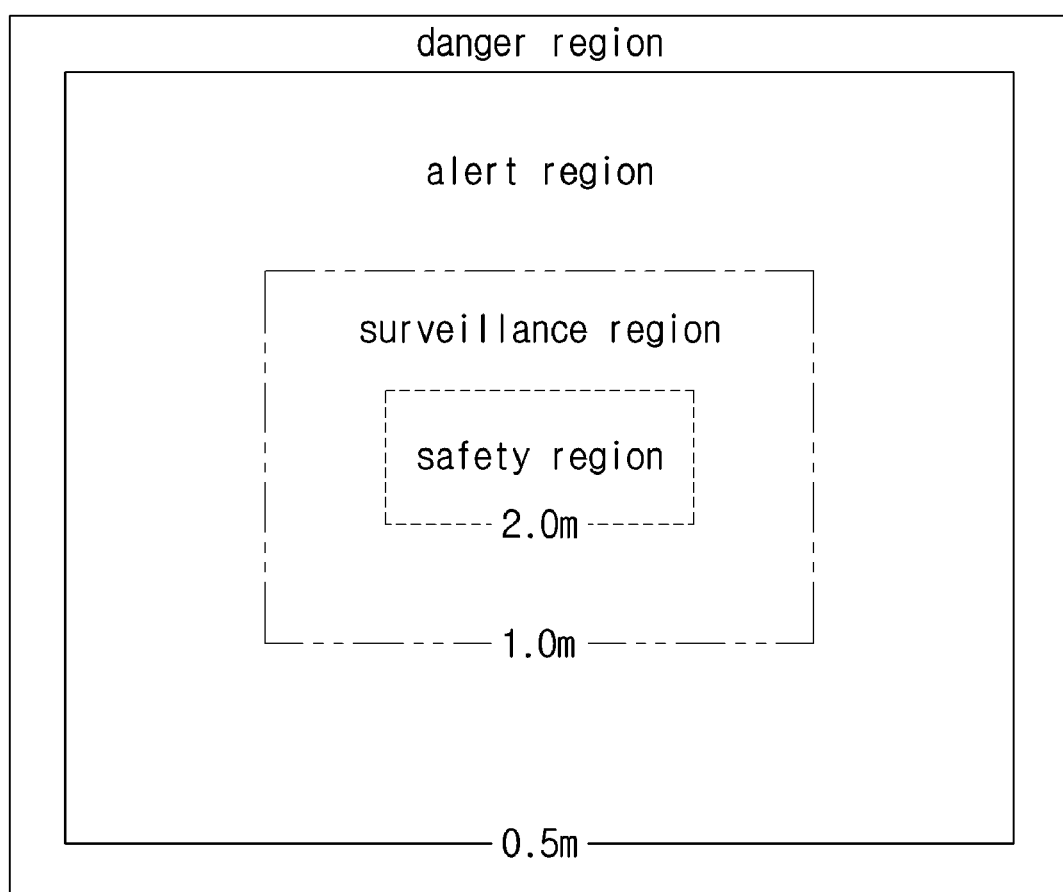
FIG. 3 illustrates an example of a screen display representing the regions of FIG. 2.

FIG. 1 schematically illustrates the composition of an apparatus for electric vehicle collision avoidance according to an embodiment of the invention, FIG. 2 illustrates an example of regions configured according to distance from the electric vehicle, and FIG. 3 illustrates an example of a screen display representing the regions of FIG. 2. In the following, an apparatus for electric vehicle collision avoidance according to an embodiment of the invention is described focusing mainly on FIG. 1 but also with reference to FIG. 2 and FIG. 3.

Referring to FIG. 1, an apparatus for electric vehicle collision avoidance according to an embodiment of the invention may include a camera unit 10, a monitoring unit 20, a power management unit 30, and a notification unit 40.

The camera unit 10 may acquire images of the electric vehicle's surroundings. For example, the camera unit 10 can include a multiple number of cameras installed respectively on the front, rear, left, and right sides of the electric vehicle to obtain images in four directions with respect to the electric vehicle, with the cameras operated when the electric vehicle is being driven. The camera unit 10 can also be operated by a manipulation on a separately provided switch.

In particular, the camera unit 10 can acquire images of the electric vehicle's surroundings in a preset number of frames per second in accordance with the control of the monitoring unit 20.

The monitoring unit 20 may analyze the images of the electric vehicle's surroundings obtained by the camera unit 10 to monitor objects that approach the electric vehicle. The monitoring unit 20 can be, for example, an around view monitoring (AVM) system.

In particular, the monitoring unit 20 can recognize an object present in the images, by using image frames obtained in a preset number of frames per second to monitor changes in consecutive image frames, can estimate the distance between the electric vehicle and the object as well as the approaching speed of the recognized object based on the positions and the changes in size of the object in the images, and based on the estimated distance and approaching speed, can provide a notification that an object has appeared or is approaching or transmit a power cutoff command signal to the power management unit 30 so that the power management unit 30 may cut off power to the electric vehicle.

For example, as illustrated in FIG. 2, a danger region, an alert region, and a surveillance region can be set, in the order of closeness to the electric vehicle, according to preset distances from the electric vehicle. The outside of the surveillance region can be set as a safety region.

As illustrated in FIG. 3, the danger region, alert region, surveillance region, and safety region can be displayed on the screen in order from the boundary region of the screen to the center region, according to the preset distances. The screen displaying the danger region, alert region, surveillance region, and safety region can output the image frames acquired by the camera unit 10 in a preset number of frames per second. Using this, the monitoring unit 20 can detect the appearance of an object in the surrounding of the electric vehicle and can monitor the approaching status of the object that has appeared by estimating the distance to and the approaching speed of the object.

For example, the monitoring unit 20 can monitor changes in consecutive image frames by using image frames obtained at 30 frames per second and can determine that an object has appeared if an object is detected in the surveillance region on the screen illustrated in FIG. 3. That is, when an object moves from the safety region to the surveillance region on the screen or when an object grows in size within the safety region to be displayed as encroaching the surveillance region, the monitoring unit 20 can determine that the object has appeared in the surveillance region. Then, the monitoring unit 20 can estimate the approaching speed of the object from the rate of change (i.e. rate of increase or rate of decrease) in the size of the object between consecutive image frames. From this, it is possible to estimate the predicted time when the object is expected to enter the alert region from the surveillance region and the predicted time when the object is expected to enter the danger region from the alert region, and the monitoring unit 20 can inform the user of the estimated entry prediction times or transmit a power cutoff command signal to the power management unit 30 in consideration of the entry prediction time concerning entry from the alert region into the danger region such that power may be cut off before the object enters the danger region. In other words, the monitoring unit 20 can generate a power cutoff command signal at a preset duration of time before the entry prediction time at which the object is predicted to enter the danger region from the alert region.

In this way, the monitoring unit 20 can monitor the entry of the object from the surveillance region into the alert region and from the alert region into the danger region. Here, when the object enters the alert region from the surveillance region, the monitoring unit 20 can monitor changes in consecutive image frames by using image frames acquired at 100 frames per second. As the alert region represents positions where an object may potentially collide with the electric vehicle, the monitoring should be performed at a faster speed compared to the surveillance region.

Afterwards, if an object has entered from the alert region into the danger region, the monitoring unit 20 may transmit a power cutoff command signal to the power management unit 30 such that the power management unit 30 cuts off the power of the electric vehicle.

The power management unit 30 may cut off the power of the electric vehicle in accordance to the power cutoff command signal received from the monitoring unit 20.

For example, the power management unit 30 can be a battery management system (BMS) of the electric vehicle.

The battery management system of an electric vehicle manages the overall state of a battery pack, which is made of multiple battery cells, mounted on the electric vehicle. That is, the battery management system can detect the voltage, current, temperature, etc., of the battery pack, estimate the state of charge (SoC) through computations, and control the state of charge such that the consumption of electricity of the vehicle reaches maximum efficiency.

The battery management system can include a measurement circuit and a balancing circuit, to used for measuring the voltage and temperature of the battery pack and for performing battery cell balancing, which is to control the voltage and temperature of the battery pack based on the measured voltage and temperature.

The battery management system can control the charging and/or discharging of the battery pack by controlling a relay provided on the power supply line to the electric vehicle or the charging line of the battery pack.

Thus, the power management unit 30 can cut off the power of the battery pack by turning off the relay in response to the power cutoff command signal of the monitoring unit 20. As a result, the power of the battery pack can be cut off, and the driver, passengers, or animals on board can be protected from being harmed by any leaked electrical energy.

The notification unit 40 may auditorily or visually output the monitoring information generated by the monitoring unit 20.

For example, the notification unit 40 can include an alarm that sounds of an alarm noise and/or a display device that displays the monitoring information. Here, the display device can display a detected object as well information on the distance and approaching speed of the detected object through a screen such as that shown in FIG. 3.

Figure 4:
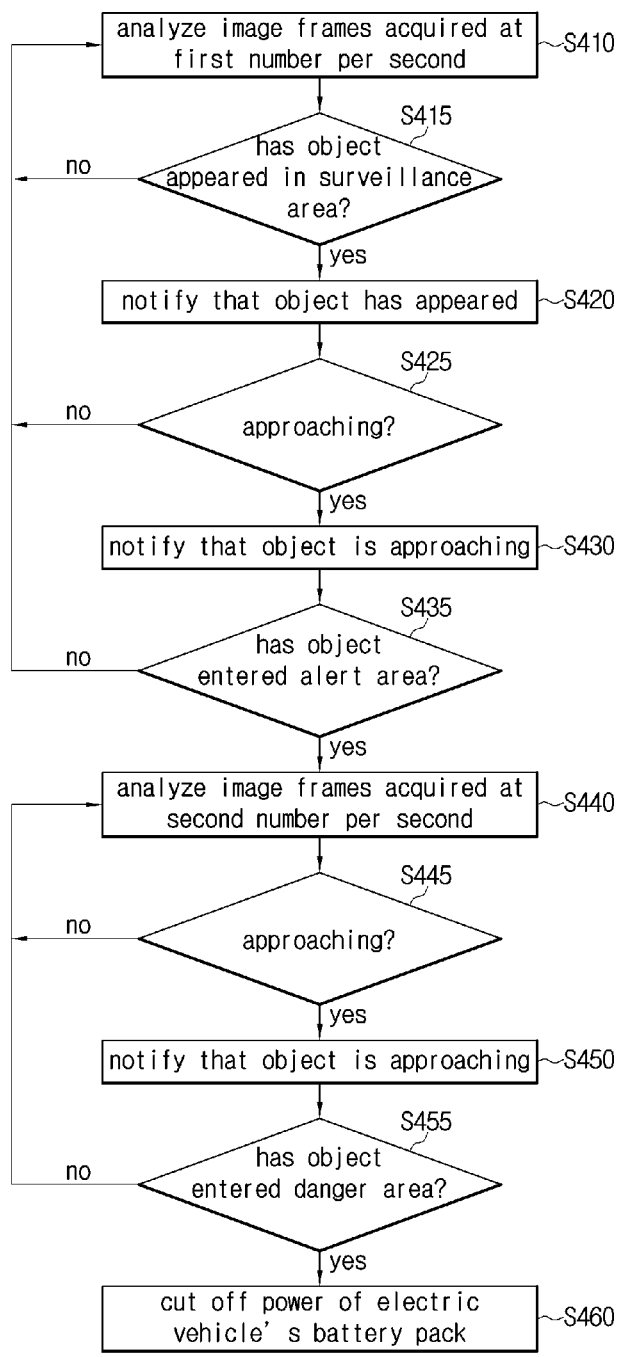
FIG. 4 is a flowchart illustrating a method for electric vehicle collision avoidance according to an embodiment of the invention.

FIG. 4 is a flowchart illustrating a method for electric vehicle collision avoidance according to an embodiment of the invention.

In operation S410, the apparatus for electric vehicle collision avoidance may acquire images of the surroundings of the electric vehicle as a first number of as image frames per second and may analyze the image frames acquired at a first number of frames per second. For example, the apparatus for electric vehicle collision avoidance can acquire the image frames at 30 frames per second.

In operation S415, the apparatus for electric vehicle collision avoidance may monitor changes in consecutive image frames to determined whether or not an object appears in a preset surveillance region. For example, the apparatus for electric vehicle collision avoidance can monitor changes in consecutive image frames by using the image frames obtained at 30 frames per second and can determine that an object has appeared if an object is detected in the surveillance region of the screen. That is, if an object moves on the screen from the safety region into the surveillance region, or if an object grows in size while within the safety region to be displayed as encroaching the surveillance region, then the apparatus for electric vehicle collision avoidance can determine that the object has appeared in the surveillance region.

In operation S420, if an object has appeared in the surveillance region, then the apparatus for electric vehicle collision avoidance may notify the user that an object has appeared. For example, the apparatus for electric vehicle collision avoidance can notify the user of the appearance of the object through an alarm that sounds off an alarm noise or through a display device that displays the monitoring information.

In operation S425, the apparatus for electric vehicle collision avoidance may determine whether or not the object that has appeared in the surveillance region is approaching. For example, the apparatus for electric vehicle collision avoidance can estimate the approaching speed of the object from the rate of change (i.e. rate of increase or rate of decrease) in the size of the object in consecutive image frames.

In operation S430, if it is determined that the object is approaching, the apparatus for electric vehicle collision avoidance may provide notification of the object approaching.

In operation S435, the apparatus for electric vehicle collision avoidance may determine whether or not the approaching object enters from the surveillance region into a preset alert region.

In operation S440, if the object has entered the alert region, the apparatus for electric vehicle collision avoidance may notify the user that an object has entered the alert region, acquire the images of the surrounding of the electric vehicle at a second number of image frames per second, and analyze the image frames acquired at a second number of image frames per second. For example, the apparatus for electric vehicle collision avoidance can obtain the image frames at a 100 frames per second.

In operation S445, the apparatus for electric vehicle collision avoidance may determine whether or not the object that has entered the alert region is approaching.

For example, the apparatus for electric vehicle collision avoidance can monitor changes in consecutive image frames by using image frames acquired at 100 frames per second and can estimate the approaching speed of the object from the rate of change in the size of the object in consecutive image frames, for determining whether or not the object is approaching.

In operation S450, if it is determined that the object is approaching, then the apparatus for electric vehicle collision avoidance may provide notification that an object is approaching.

In operation S455, the apparatus for electric vehicle collision avoidance may determine whether or not the approaching object enters from the alert region into a preset danger region. For example, if an object moves on the screen from the alert region into the danger region, or if an object grows in size within the alert region to be displayed as encroaching the danger region, then the apparatus for electric vehicle collision avoidance can determine that an object has entered the danger region.

In operation S460, if an object has entered the danger region, the apparatus for electric vehicle collision avoidance may cut off the power of the electric vehicle. For example, the apparatus for electric vehicle collision avoidance can cut off the power of the battery pack by turning off a relay.

Afterwards, if a signal is inputted that requests the repowering of the electric vehicle, such as in the form of a user manipulation on the accelerator pedal, then the apparatus for electric vehicle collision avoidance may provide control such that power is supplied again to the electric vehicle. For example, if the accelerator pedal of the electric vehicle is manipulated, then the apparatus for electric vehicle collision avoidance can turn on the relay such that the power of the battery pack may be supplied to the electric vehicle.

The components of the embodiments described above can also be easily understood from the perspective of processes. That is, the components can each be understood as a process. Likewise, the processes of the embodiments described above can also be easily understood from the perspective of an apparatus' components.

The technical features described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software. Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., configured specially for storing and executing program instructions. Examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The embodiments of the invention described above are disclosed only for illustrative purposes. A person having ordinary skill in the art would be able to make various modifications, alterations, and additions without departing from the spirit and scope of the invention, but it is to be appreciated that such modifications, alterations, and additions are encompassed by the scope of claims set forth below.

What is claimed is:

1. An apparatus for electric vehicle collision avoidance, the apparatus comprising:
    a camera unit configured to acquire an image of surroundings of an electric vehicle;
    a monitoring unit configured to control the camera unit such that the image is acquired as a preset number of image frames, recognize an object present in the image by monitoring changes among consecutive image frames, estimate whether the recognized object is positioned in one of a danger region, an alert region, a surveillance region, and a safety region in the image, and generate a power cutoff command signal when the estimated object enters the danger region from the alert region; and
    a power management unit configured to cut off a power of a battery pack of the electric vehicle in response to the power cutoff command signal,
    wherein the danger region, the alert region, the surveillance region, and the safety region are set in the image in order of closeness to the electric vehicle based on a preset distance from the electric vehicle in the image, and
    wherein the monitoring unit monitors whether a user of the electric vehicle manipulates an accelerator pedal of the electric vehicle after the power of the battery pack is cut off, and generates a re-powering request signal when the accelerator pedal is manipulated, and the power management unit supplies a power to the battery pack based on the re-powering request signal.

2. The apparatus for electric vehicle collision avoidance of claim 1, wherein the danger region, the alert region, the surveillance region, and a safety region representing an outside of the surveillance region are displayed in order on a screen from a boundary region towards a center region of the screen according to preset distances.

3. The apparatus for electric vehicle collision avoidance of claim 2, wherein the monitoring unit determines that the object has appeared if the object is detected in the surveillance region during a monitoring using image frames acquired in a first number per second, and the monitoring unit monitors changes in the consecutive image frames by using image frames acquired in a second number per second if the object enters from the surveillance region into the alert region,
    and wherein the second number is greater than the first number.

4. The apparatus for electric vehicle collision avoidance of claim 3, wherein the monitoring unit determines that the object has appeared in the surveillance region if the object enters from the safety region into the surveillance region on the screen or if the object grows in size while in the safety region to be displayed as encroaching the surveillance region.

5. The apparatus for electric vehicle collision avoidance of claim 1, wherein the monitoring unit detects an approaching of the object by estimating an approaching speed of the object from a rate of change of a size of the object in the consecutive image frames.

6. The apparatus for electric vehicle collision avoidance of claim 5, wherein the monitoring unit estimates a first entry prediction time and a second entry prediction time by using the approaching speed, the first entry prediction time associated with a time of entry of the object from the surveillance region into the alert region, and the second entry prediction time associated with a time of entry of the object from the alert region into the danger region.

7. The apparatus for electric vehicle collision avoidance of claim 1, wherein the camera unit comprises a plurality of cameras installed respectively on a front, rear, left, and right side of the electric vehicle for acquiring images in four directions with respect to the electric vehicle.

8. The apparatus for electric vehicle collision avoidance of claim 1, further comprising a notification unit configured to auditorily or visually output monitoring information generated by the monitoring unit.

9. A method for electric vehicle collision avoidance performed by an apparatus for electric vehicle collision avoidance, wherein the apparatus comprises a camera unit, a monitoring unit and a power management unit, the method comprising:

acquiring, by the camera unit, an image of surroundings of an electric vehicle as a preset number of image frames;

recognizing, by the monitoring unit, an object present in the image by monitoring changes among consecutive image frames;

estimating, by the monitoring unit, whether the recognized object is positioned in one of a danger region, an alert region, a surveillance region, and a safety region in the image;

cutting off, by the power management unit, a power of a battery pack of the electric vehicle when the estimated object enters the danger region from the alert region;

monitoring, by the monitoring unit, whether a user of the electric vehicle manipulates an accelerator pedal of the electric vehicle after the power of the battery pack is cut off; and supplying, by the power management unit, a power to the battery pack based on a re-powering request signal, wherein, the danger region, the alert region, the surveillance region, and the safety region are set in the image in order of closeness to the electric vehicle based on a preset distance from the electric vehicle in the image.

10. The method for electric vehicle collision avoidance of claim 9, wherein the danger region, the alert region, the surveillance region, and a safety region representing an outside of the surveillance region are displayed in order on a screen from a boundary region towards a center region of the screen according to preset distances.

* * * * *